March 16, 1965     E. LACHENMEIER     3,173,220

READER BOARD

Filed Jan. 29, 1962

INVENTOR.
EMIL LACHENMEIER
BY
Lee R. Schermerhorn
Attorney

United States Patent Office 3,173,220
Patented Mar. 16, 1965

3,173,220
READER BOARD
Emil Lachenmeier, 1833 N. Sumner, Portland 17, Oreg.
Filed Jan. 29, 1962, Ser. No. 169,257
4 Claims. (Cl. 40—140)

This invention relates to a reader board type of sign having removable letters for changing the sign from time to time.

Such reader boards are used on the marquees of theaters to display the titles of plays or motion pictures and in markets and stores to list featured merchandise. They are also used by real estate dealers to list available properties and are used by others for similar display purposes requiring rather large letters to be read from a considerable distance.

Objects of the invention are to provide an improved reader board of the type described which is relatively simple and inexpensive to manufacture and yet sufficiently rugged and durable for the purpose, to provide improved supporting means for removable characters, to improve the facility with which the characters may be applied and removed, to provide an attractive reader board for either outside or inside installation and to provide a reader board adapted for back lighting of the characters thereon.

Additional objects and advantages will become apparent and the invention will be better understood from the following description of the preferred embodiment illustrated on the accompanying drawing. Various changes may be made, however, in the details of construction and arrangement of parts and all such modifications within the scope of the appended claims are included in the invention.

Figure 1:
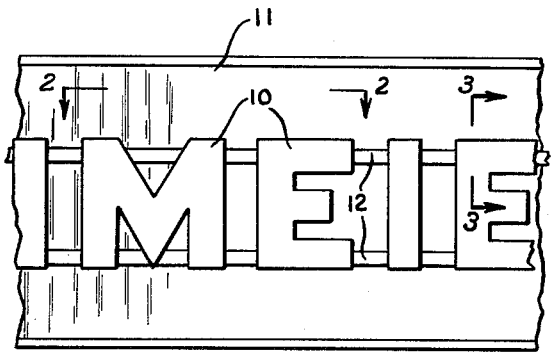
FIGURE 1 is a front elevation view of a portion of a reader board embodying the features of the invention.
Figure 3:
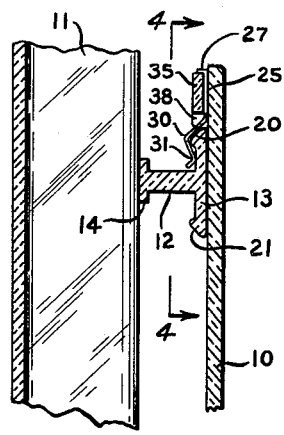
FIGURE 3 is an enlarged sectional view taken on the line 3—3 of FIGURE 1.
Figure 2:
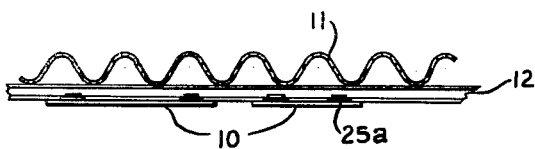
FIGURE 2 is a sectional view taken on the line 2—2 of FIGURE 1.
Figure 4:
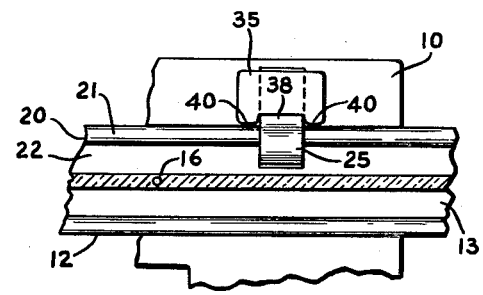
FIGURE 4 is a view taken on the line 4—4 of FIGURE 3.

In FIGURES 1, 2 and 3, the letters or other characters 10 are removably mounted on the front of a vertical supporting board 11. The board 11 in this instance comprises a corrugated sheet of translucent plastic in which the corrugations run in a vertical direction. The letters 10 are opaque and preferably of a color to contrast with the color of the board in front lighting. The corrugated plastic sheet comprising the board 11 is preferably of a light color or milky white to pass light therethrough for back lighting.

Such a sign is very effective with back lighting since the board 11 then provides a brightly illuminated background leaving the characters 10 dark or at least less brightly illuminated from any scattered light that may be present at the front side of the sign. Back lighting is achieved by the use of fluorescent tubes or other distributed light source behind the board 11 which will illuminate the whole board uniformly in a well-known manner. The use of a vertically corrugated sheet imparts the necessary strength and stiffness with a minimum thickness of material, making a lightweight and economical sign.

In an outside installation the back lighting is necessary only at night since the natural daylight will provide adequate front lighting during the daytime. However, front lighting by flood lights may be employed instead of back lighting if desired. In an inside installation the user may employ back lighting or no special lighting at all, relying upon scattered light in the store or building where the sign is used to illuminate the sign adequately. The present sign is thus adapted to all needs.

The characters 10 are mounted on upper and lower horizontal T-shaped rails 12. These rails are preferably extruded from a clear transparent plastic whereby they are practically invisible and are not distracting to the reader under either front lighting or back lighting. Each rail 12 has a wide front flange 13 and a narrower back flange 14. The back flange 14 provides a sufficiently wide and flat base for firm anchorage to the board 11.

When the back board comprises a vertically corrugated plastic sheet as shown in FIGURES 1, 2 and 3, the back flange 14 may be mounted by means of adhesive on the crests of the forward convolutions which engage the flange 14. A plastic solvent such as acetone makes a suitable adhesive for the purpose, providing an integral union between the rails 12 and the plastic sheet 11. The rails thus extend transversely of the corrugations and are of a structural shape to stiffen and strengthen the sheet.

Figure 6:
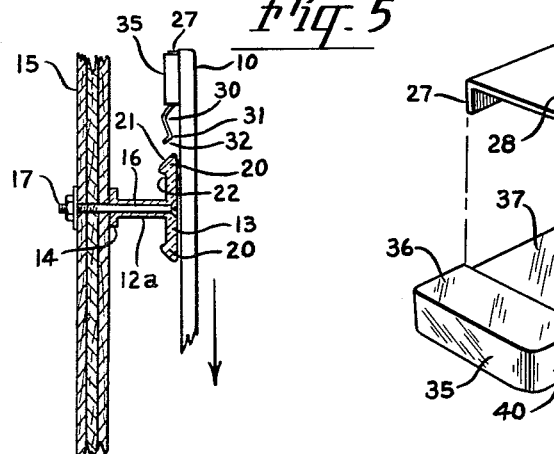
FIGURE 6 is a view similar to FIGURE 3 showing a modification and illustrating the manner of mounting a character on the board.

FIGURE 6 shows a plywood back board 15 which requires the sign to be lighted from the front. In this case the rails 12a are drilled at 16 through the web portions to receive bolts or screws 17 through the plywood. Again, the back flange 14 provides a flat stable base to furnish an adequate bearing area against the front side of the board 15. Except for the drill holes 16 the rails 12a are identical with the rails 12.

The front flange 13 of the rails 12 and 12a has a thickened bead 20 along its upper edge on the rear side of the flange. The rear side of this bead has a flat face 21 inclined at an angle of approximately 30° from the vertical plane of the flange for a purpose which will be presently explained. Under the lower edge of inclined surface 21 the flange 13 is reduced in thickness to provide a recess 22. The lower edge of flange 13 is not used in mounting the characters 10 but for convenience of manufacture and assembly the rail is made symmetrical so that either edge of the flange may be turned uppermost. Thus, the lower edge of flange 13 also has a bead 20 as just described.

Figure 5:
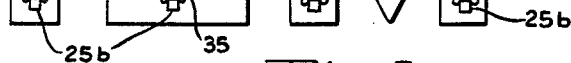
FIGURE 5 is a view of the back sides of the characters shown in FIGURE 1.

Each character 10 is provided on its back side with one or two hanger clips 25a depending upon the width of the upper portion of the character, as shown in FIGURE 5. These hanger clips are at the top of the character. Similarly, at the bottom of each character are one or two stabilizing clips 25b depending upon the width of the lower portion of the character. The hanger clips 25a and stabilizer clips 25b are identical and will be referred to generally by the numeral 25.

Figure 7:
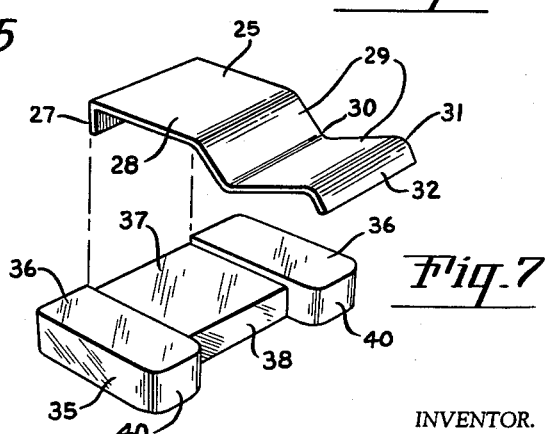
FIGURE 7 is an enlarged exploded view showing the details of a mounting clip used for supporting the characters on the board.

Each clip 25 is made from a flat strip or leaf of suitable non-corrodable spring metal such as brass. The upper end of the strip is flanged rearwardly at right angles to form a hook as indicated at 27 in FIGURE 7. The upper portion 28 adjoining flanges 27 is flat. Below flat portion 28 the strip is bent into a rearwardly projecting V 29 having a rounded apex portion at 30. The lower end of the spring clip terminates in a rounded bend 31 adjacent to a short terminal flat portion 32. Flat portion 32 is disposed at an angle of approximately 30° to the plane of the upper flat portion 28, corresponding to the 30° angle of surface 21 on the rail flange.

Each spring clip 25 is clamped against the flat back surface of a character 10 by means of a clamp plate 35. Each clamp plate 35 has flat end surfaces 36 on its front side adapted to be adhesively united to the back surface of the character 10 as, for example, by the application of acetone. Between the end surfaces 36 the mid-portion of clamp plate 35 is depressed at 37 a distance equal to the thickness of the strip material in spring clip 26. Thus, the flat portion 28 of the spring clip is disposed in recess 37 with top flange 27 hooked over the upper edge of clamp plate 35. Hook 27 and V portion 29 retains the spring clip in recess 27 without requiring any adhesive on the spring clip. Characters 10 and clamp plates 35 are preferably made of plastic.

The center portion of plate 35 is also recessed vertically at 38 above the lower ends 40 of the end portions 36. This allows one leg of the V 29 of the spring clip to have free play in the open space between end portions 40 as shown in FIGURE 3. The apex 30 and inclined end surface 32 of the spring clip extend beyond the lower ends 40, 40 of plate 35. Surface 32 and bend 31 are also depressed rearwardly away from the back surface of the character 10 as shown in FIGURE 6.

Thus, when a character 10 is brought up against the rail flange 13 and moved in the direction of the arrow in FIGURE 6, the surface 32 constitutes a spring tongue parallel with the inclined surface 21 on the rail allowing the bend 31 to ride over surface 21 and the thickest portion of the bead 20 and snap into recess 22 below the bead to secure the character to the rail. In this position the bend 31 holds clamp plate ends 40 firmly against the upper edge of the rail. The upper and lower clips 25a and 25b engage the upper and lower rails simultaneously to secure the top and bottom of the character 10 to the two rails.

In the case of a narrow character having only one hanger clip 25a, such as the letter I in FIGURE 5, the spaced lower end portions 40 of clamp plate 35 provide contact points which bear against the top edge of flange 13 to align the character in a vertical direction. When the clips are properly engaged with the rail flanges, the character will be truly vertical without resorting to trial and error techniques. The upper clips 25a support the characters while the lower clips 25b prevent the lower ends of the characters from tilting forward from the wind or other disturbances. Clamp plate ends 40 also form gauge or locating points which determine the placement of the character in a vertical direction as well as preventing angular departure from the vertical.

The vertical recess 38 between the depending lower end portions 40, 40 of the clamp plate provides bending space for the spring clip so that the spring tension against the under side of bead 20 holds the character 10 firmly against the uper edge of the rail flange. An important function of the projections 40 is to provide a gauge for the true horizontal alignment of a plurality of the characters 10. The present arrangement prevents the spring tension or variations in the spring tension of the clips from shifting the characters out of such alignment.

The bending length allowed by recess 38 also prevents overstressing of the spring clips which would result in fatigue failure and breakage. In the present manner of mounting the characters shown in FIGURE 6, the spring clips are not touched with the fingers but are always bent rearwardly only sufficiently to pass over the rearward crest of the bead 20. In this way the destructive effects of careless mounting or dismounting are avoided and long life is assured for the spring clips. This manner of mounting also permits the characters to be mounted on a high sign with a placement stick equipped with means to grip and release the characters. Thus, a stepladder is not required for the purpose of reaching the spring clips with the fingers.

In mounting a character 10 is it merely placed against the rails and moved downward. For this purpose the lower clips 25b are attached to the characters 10 a short distance above their lower ends as shown in FIGURE 5. To remove a character it is merely moved up sufficiently to disengage the clips from the rails.

The upper and lower clips 25a and 25b are attached to the characters 10 in the factory by the use of a jig which assures the proper vertical spacing between the upper and lower clips and also assures that the projections 40 on each clamp plate will be oriented into horizontal alignment. Then, when a new sign board is to be erected, a number of characters 10 may be mounted at intervals on a pair of the upper and lower rails 12, the projections 40 on the clamp plates of the several characters forming a jig to hold the upper and lower rails 12 in parallelism at the proper vertical spacing.

The rails are then mounted on the back board as shown in FIGURE 3 or FIGURE 6 while the characters 10 hold the rails in their proper relative positions. The only adjustment necessary in mounting the rails is to make them horizontal and spaced properly in a vertical direction from the adjacent lines of characters. As soon as the rails have been mounted on the back board, the jig letters may be removed and the sign is ready for use. This greatly simplifies the construction of the sign board and assures the proper fit of the changeable characters thereafter.

Having now described my invention and in what manner the same may be used, what I claim as new and desire to protect by Letters Patent is:

1. In a reader board character, upper and lower spring clips secured to the back of the character, each of said clips having a depending resilient tongue with a V-shaped catch portion adjacent to its free lower end and a flat lower end portion inclined to the plane of the character and spaced therefrom, said character being attachable to supporting rails by downward movement and detachable by upward movement, and a pair of rigid abutments on said character on opposite sides of each clip arranged to engage the upper edge of the rail as gauge points to index the character in predetermined vertical position by said downward placement movement.

2. In a reader board character, a spring clip having a depending resilient tongue with a V-shaped catch portion adjacent to its free end and a flat end portion inclined to the plane of the character and spaced therefrom, a clamp plate securing said spring clip to the back of the character, a hooked upper end on said clip, said hooked end and V-shaped catch portion projecting rearwardly above and below said clamp plate to retain said clip therein, and a pair of contact points on said clamp plate projecting downward on opposite sides of said clip to locate the vertical position of said character on a support.

3. A reader board comprising a vertical back board, a pair of vertically spaced horizontal rails on the front of said board, a rearwardly projecting portion on each rail extending the length of the rail for connection with said back board, an upstanding flange on each rail spaced forward from said board, a character having upper and lower depending spring clips on its back side, said clips being engageable with said flanges by downward movement of the character and disengageable by upward movement, and a pair of rigid abutments on said character on opposite sides of each spring clip arranged to engage the upper edge of the rail as gauge points to index the character in predetermined vertical position by said downward placement movement.

4. A reader board as defined in claim 3, said flanges being flat in a vertical plane and each having a bead projecting rearwardly from its upper edge, said clips engaging under said bead to clamp said abutments downward against the upper edge of the rail.

References Cited by the Examiner

UNITED STATES PATENTS

| | | | |
|---|---|---|---|
| 2,092,508 | 9/37 | Hammar | 40—142 |
| 3,022,591 | 2/62 | Faulkner | 40—140 |
| 3,022,592 | 2/62 | Faulkner | 40—140 |
| 3,028,700 | 4/62 | Faulkner | 40—140 |

FOREIGN PATENTS 572,422  2/24  France.

JEROME SCHNALL, *Primary Examiner.*

E. V. BENHAM, *Examiner.*